April 18, 1933.                H. H. PURVIS                1,904,250
                      AUTOMATIC PRESSURE SEALING MEANS
                             Filed April 27, 1932
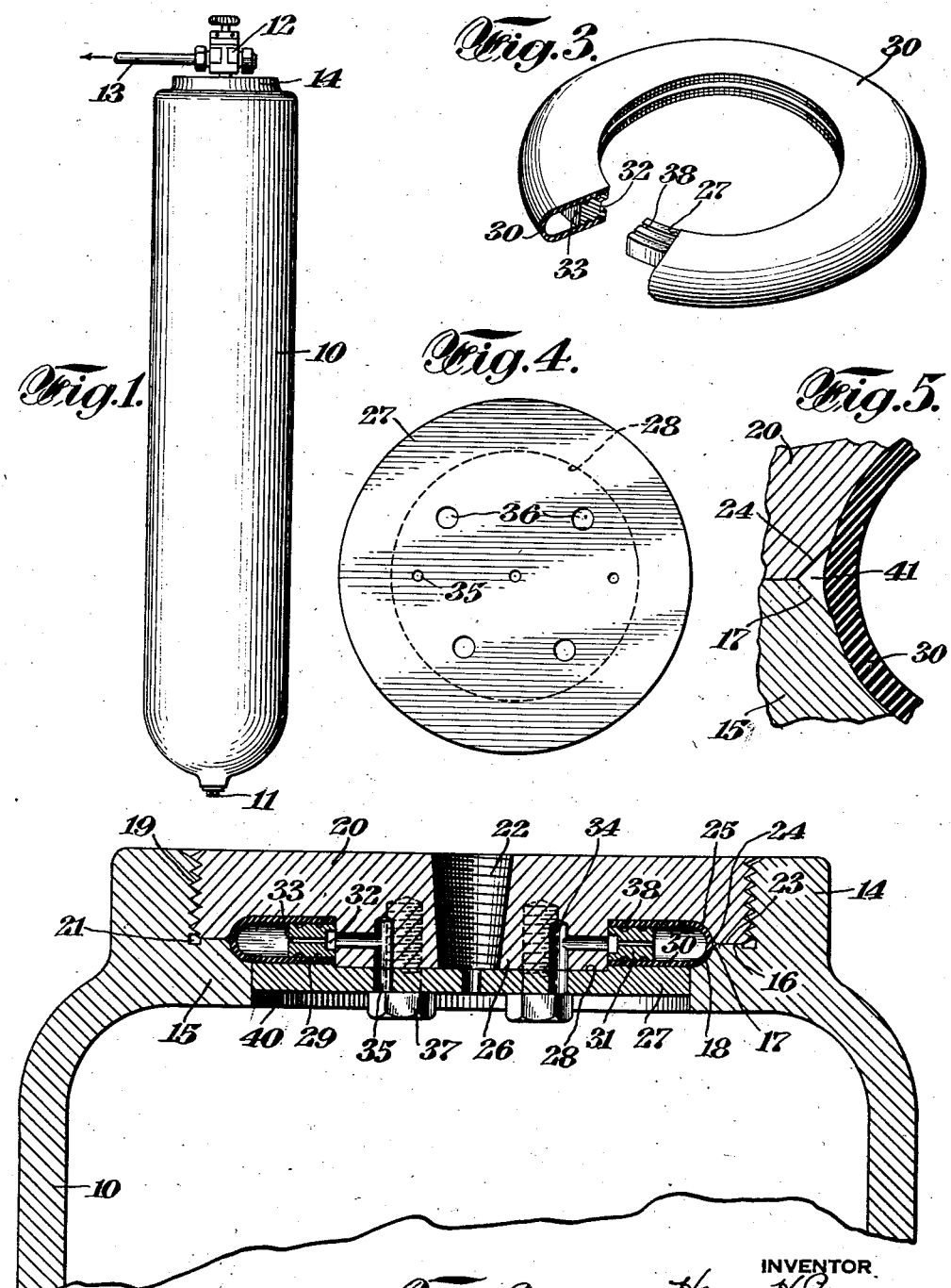
INVENTOR
Harry H. Purvis
BY Kenyon & Kenyon
ATTORNEYS Patented Apr. 18, 1933

1,904,250

UNITED STATES PATENT OFFICE

HARRY H. PURVIS, OF PORT JEFFERSON, NEW YORK, ASSIGNOR TO PURE CARBONIC COMPANY OF AMERICA, A CORPORATION OF DELAWARE

AUTOMATIC PRESSURE SEALING MEANS

Application filed April 27, 1932. Serial No. 607,687.

This invention relates to apparatus for automatically producing a pressure-tight closure in a fluid container and more particularly refers to a gasket which is ballooned by the interior pressure in the container or tank and associated structure and which thereby becomes capable of sealing pressures in the neighborhood of several thousand pounds per square inch without leaking. Places such as soda fountains which dispense charged liquids are usually furnished with a tank of liquid carbon dioxide which is used at necessary intervals to charge other liquids. Heretofore the common practice has been to remove an empty tank and substitute a filled one obtained from manufacturers. The inconvenience of removing the charging apparatus and the labor connected with the removal, and the delivery and installation of a newly filled tank are all reflected in the cost of the commodity.

At the present time there is a method of producing such tanks containing liquid carbon dioxide on the premises at lessened cost and without the drawbacks of the older system. This method involves the placing of a definite amount of solid carbon dioxide or dry ice in an empty tank and closing it with the usual plug. As the internal pressure within the tank builds up the critical pressure at which the liquid can exist is reached and eventually the entire tank is converted to a tank of liquid carbon dioxide ready for use. As the pressures involved in this process amount in a fully charged tank to around a thousand pounds per square inch, unless the seal around the closing plug is absolutely pressure-tight a satisfactory result cannot be obtained. When a pressure-tight joint is sought with the ordinary gasket heretofore used, the closing members must be tightened to an extra-ordinary degree and with an unusual amount of care. As the dispenser prefers to close the tank by hand after inserting the dry ice without the use of wrenches or other tools necessary to tighten up the plug, there has arisen a real need for a gasket which prevents leakage around the closure member and utilizes the interior pressure in the tank for its effective sealing.

An object of this invention is to provide a sealing closure for a high pressure fluid container and a still further object is to furnish a gasket which seals a loose closure joint in a fluid container by ballooning, owing to the interior pressure therein. Another object of this invention is to make a gasket in which it will be impossible for the fluid pressures to seep around and destroy the seal, and a further object is to provide a gasket operating by means of the interior pressures in a tank whose effectiveness is attributable to the existence of unbalanced pressures distorting the gasket at the necessary points.

Features of this invention are to be found in the ease of replenishment and the ease of replacement and of the lower cost of the product contained. Further features are found in the fact that the closing of such a tank is an easy matter and that no precautions for sealing such high pressures have to be taken; furthermore, regardless of the shape of the vessel or the position of the opening therein, the same results are obtainable by the use of this invention.

Applying the invention to the specific use previously mentioned, dry carbon dioxide is placed inside of a tank and a loosely threaded screw plug is turned down into the mouth of the tank by hand. This plug is usually provided with a tap for a discharge valve. Around the periphery of the plug on the under side thereof the surface is machined to make a machine fit but not a gas tight joint with a shoulder in the mouth of the tank. Leading from the flat surface on the under side of the plug is a small bevel followed by a shallow recess.

A central hub on the plug has two right-angled passages connecting with the interior of the tank. A locking plate fastened to this hub has a flange extending from the side of the hub to the side of the tank opening. When in place a U-shaped chamber is formed by the recess in the plug, the flange on the plate and a curved seat at the inner end of the shoulder at the tank mouth.

The dimensions of this chamber are exactly those of an elastic U-shaped gasket which, when the plug is assembled and before it is screwed into the tank, resembles an inflated tire half imbedded in the under side of the plug so that the joint between the plug and the tank is precisely in the center of the U of both chamber and gasket. Closely fitting around the hub and inserted between the two sides of the U-shaped gasket is a ring which is pierced to permit the pressure in the interior of the tank to reach the interior of the ballooning gasket.

A small arrowhead groove in the gasket chamber is formed by the bevels on the under side of the plug and on the edge of the shoulder in the mouth of the tank. As pressure builds up within the tank and balloons the distortionable gasket the unbalanced pressures between the outside and the inside of the gasket tend to force the gasket against the curved seat and to wedge a portion of the same into this groove and an effective seal for any pressure in the tank is made. In making the locking plate of a size to closely fit within the opening in the tank, the smallest part of the outside surface of the gasket is exposed to the tank pressure.

It is at this point that the gasket is most likely to be in equilibrium owing to a balance of pressures on both sides and seepage and consequent leakage is most likely to occur. As the gasket is exactly contained and because there is no seepage around the rear of the gasket so as to build up pressure between the under side of the plug and the side of the gasket resting thereagainst, a true unbalanced pressure is produced in this ballooning gasket. Thus there is a sort of pressure gradient increasing in unbalance from the lower side of the gasket all the way around to the upper side. Such seepage around the ends or sides of the gasket is prevented by means of the metal ring inserted therein and the locking plate which clamp these sides so that they are pressure tight and not liable to collapse or undue distortion.

Owing to this unbalance of pressure the gasket material will be thinner where the unbalance is greatest producing a greater thickness of gasket at the points where would be the natural path of leakage. Thus the gasket without any balancing pressure on the outside of the upper portions is thinned by the distortion to a greater extent than the lower side where outside pressure is greater with the result that an elastic flow occurs making the thickness of the lower side greater than normal.

Although the described embodiment of the invention is described largely in connection with one particular use, it is possible for a reverse application of the invention to be applied without falling outside of the scope of the invention. As for instance, if the passages in the hub leading to the interior of the tank were to lead to the exterior of the tank and the tank pumped out to provide a vacuum, the atmosphere could then be relied upon to balloon the gasket proportionately to the evacuation within the tank and the same principle and advantages would accrue.

Also the sealing produced by the arrowhead groove around the gasket chamber can be multiplied under some circumstances and a plurality of such grooves may at times be efficiently used. That other benefits and advantages follow from this invention will be apparent from the following description and drawing in which Fig. 1 is a side view of a liquid carbon dioxide tank with the discharge connections in position;

Fig. 2 is a view of the top of the tank in cross-section showing the closure means assembled which are the object of this invention;

Fig. 3 is a perspective view showing the ring and gasket assembled together;

Fig. 4 is a plan view of the locking plate alone; and

Fig. 5 is a greatly enlarged view of the end of the gasket chamber illustrating the arrowhead groove and the wedging action of the gasket.

Referring to the drawing, 10 indicates a circular steel tank for containing a fluid under pressure. A draining plug 11 with a discharge valve 12 and discharge line 13 are affixed to the tank in the usual manner. A wide mouth 14 at the top of the tank 10 is countersunk a short distance terminating in an interior flange 15. The distance between the sides of this flange measure the available opening 40 of the tank and should be large enough to satisfactorily insert dry ice or similar material. At the outermost portion of flange 15 is a machined shoulder 16, the inner edge of which is beveled at 17 and from thence a curved seat 18 is made to the edge of opening 40.

Mouth 14 above flange 15 is threaded at 19 to engage corresponding threads on a closing screw plug 20. This plug is made to screw loosely into tank 10 by hand. Around the base of threads 19 is a groove 21 to permit plug 20 to be brought down hand-tight against flange 15. Plug 20 is usually tapped at 22 to accommodate a discharge valve 12.

The underside of plug 20 is machined at 23 to form a surface which makes a non-gas-tight joint with shoulder 16 when tank 10 is closed. Surface 23 has the dimensions of shoulder 16 and likewise the inner edge is beveled at 24. Bevels 17 and 24 form an arrowhead groove 41. Likewise again, plug 20 has an upper seat 25 making a semicircle with seat 18. The inner end of seat 25 continues in a straight line to a central hub 26 projecting from the under side of plug 20.

A locking plate 27 with countersunk portion 28 which fits directly over the top of hub 26 has a circular flange 29 which fills the opening 40 between hub 26 and flange 15. These parts are accurately fitted together and provide a circular U-shaped chamber between the under side of plug 20, locking plate 27 and seats 18 and 25.

A rubber U-shaped gasket 30 of uniform thickness having the same dimensions as this chamber or slightly larger is adapted to fit horizontally therein with the closed end outermost. A brass or steel ring 31 closely fitting around hub 26 is inserted between the sides of gasket 30 at the inner, open end and serves to clamp the gasket and to prevent its collapse or improper distortion as indicated in Figs. 2 and 3. Ring 31 is formed with an annular channel 32 on its inner side against the side of hub 26 and has a small hole 33 as a direct passage from channel 32 to the inside of gasket 30.

Hub 26 is furnished with one or more right-angled passages 34, one branch of which opens in the wall of hub 26 in registry with the annular channel 32 and the other of which leads downwardly continuing through opening 35 in locking plate 27 to directly connect the gasket with the interior of the tank. Holes 36 for the cap screws 37 are in staggered relation as shown in Fig. 3, so that plate 27 can only be fastened to hub 26 in one angular position.

Inasmuch as the thickness of the rubber in the two sides of gasket 30 plus the depth of brass ring 31 is purposely made greater than the depth of the gasket chamber when locking plate 27 is in place, there is effected a pressure-tight clamping of the sides of gasket 30 from the ends thereof to the outer edges of the ring 31. Referring to Fig. 2 it can be seen that the upper side of gasket 30 is clamped between the under side of plug 20 and ring 31 and that the lower side of the gasket is clamped between the ring and flange 29 on locking plate 27. This clamping prevents any fluid seepage or leakage around the ends of gasket 30 as to build up pressures on the outside thereof along the walls of the chamber would probably destroy the seal. Circular grooves 38 are furnished in the top and bottom of brass ring 31 to aid the clamping of gasket 30.

To begin the initial operation of a tank using this invention, ring 31 is slipped inside gasket 30 and then slipped over hub 26 on plug 20. Locking plate 27 is then put on in the only position in which it can be fastened to the hub, and cap screws 37 tightened. The gasket then looks like a small tire embedded in plug 20. Once this assembly is made, the gasket lasts indefinitely. Plug 20 is then conveniently screwed down by hand and left until the wanted effects take place in tank 10.

In making the gasket chamber which so closely confines gasket 30 to such accurate measure, several results are obtained. The first is that, inasmuch as rubber and steel do not slide on one another, seat 18 on the tank must exactly correspond with the curvature of the end of the gasket as plug 20 is being screwed down. Also confining the gasket 30 by means of a chamber which exactly measures the outside dimensions of the gasket with the exception of the clamping effect obtained along the top and the bottom of the ring 31, permits every ounce of fluid pressure within the gasket to make a seal. This would not be the case if the chamber were larger or smaller than gasket 30.

In the embodiment described, the only distortion permitted gasket 30 is into groove 41 so that it wedges into any opening between plug 20 and tank 10, indicated in Fig. 5. As the diameter of locking plate 27 is substantially the same as opening 40, there is the smallest possible outside area of gasket 30 exposed to the direct action of the pressure within the tank. This unbalance of pressures running from a maximum along the upper side of the gasket to a minimum in the small space between the edge of locking plate 27 and the side of opening 40 also prevents any seepage usually incident to gaskets of this nature and which eventually destroy the seal. There is, on account of the greater unbalance of pressures on the upper side of the gasket, a tendency to form a greater thickness of elastic material against the seat 18 where the tendency to leakage or seepage past the gasket is most likely to occur.

By reversing the vertical branch of passage 34, tank 10 can be used as a vacuum bottle and during the exhausting thereof the atmosphere will act on the inside of gasket 30 to effectively preserve the vacuum within the tank. This is a mere reversal of one form of the invention and is considered to be a part of the same. In fact, many changes may be made in the form of this invention by one skilled in the art without departing from the scope thereof as defined by the following claims.

I claim:

1. In a pressure tank, a mouth therefor, a machined shoulder around the inside of said mouth, a small bevel at the end of said shoulder, a filleted surface leading from said bevel, a screw plug to close said mouth, a shoulder, a bevel and a filleted surface on the underside of said plug to register with the corresponding parts in said mouth, said filleted surfaces completing a semicircle except for a recess produced by the two bevels, a central hub on the underside of said plug, a U-shaped rubber gasket of uniform thickness surrounding said hub, a ring of rectangular cross-section inserted between the sides of said gasket and closely fitting around said hub, a locking plate fitting in the opening in the mouth of the tank and forming a flange running from the edge of the lower filleted surface to the hub, said flange forming a chamber with the underside of the plug and the filleted surfaces which is filled exactly by the gasket, said plate clamping the sides of the gasket in immovable pressure tight position, an opening in said plate communicating with an opening in said plug, an annular recess on the inner side of the ring registering with the aforementioned opening, a radial hole through said ring, and a discharge opening through said plate and said plug.

2. In a tank, a body member for holding a fluid under pressure, a closure member therefor, and an inflatable gasket bearing against parts of the closure member and body member on opposite sides of a portion of the joint between the body member and the closure member and thereby forming a seal for the joint, one of said members having a passage extending therethrough for connecting the interiors of the gasket and body member.

3. In a tank for holding a fluid under pressure, a closure therefor, the closure and tank being formed to provide a gasket chamber, an inflatable gasket of uniform thickness within said chamber for sealing the joint between the tank and closure, and means for maintaining a pressure differential with respect to the sides of the gasket whereby the gasket is so distorted as to provide a greater thickness of material in areas of greater seal-destroying pressures.

4. In a tank for holding a fluid under pressure, a closure therefor, said tank and closure being formed to provide a gasket confining chamber, an inflatable gasket in said chamber, said gasket bearing against parts of the closure and tank on opposite sides of a portion of the joint between the tank and the closure and thereby forming a seal for the joint, said portion of the joint being located between the planes of the sides of the gasket, and means for maintaining a pressure differential with respect to the sides of the gasket whereby greater sealing effect is obtained in areas of greater seal-destroying pressures.

5. In a tank for holding fluid under pressure, a closure therefor, and a substantially closed inflatable gasket carried by said closure, said gasket being positioned to bear against parts of the closure and tank on opposite sides of a portion of the joint between the tank and closure and thereby form a seal for the joint, the closure having a passage extending therethrough for connecting the interior of the gasket and tank.

6. In a closure member, a U-shaped distortable gasket, a ring interposed between the sides of said gasket, a locking plate to fasten said ring and plate to said closure member and adapted to cause the sides of the gasket to be clamped against the ring in a pressure tight seal whereby an inflatable gasket is formed.

7. In a closure member having a recess, a U-shaped distortable gasket within said recess, and means for clamping the sides of said gasket against the closure member to form an inflatable sealing gasket.

8. In a tank for holding a fluid under pressure, a closure therefor, an inflatable gasket positioned to bear against parts of the closure and tank on opposite sides of a portion of the joint between the tank and closure and thereby form a seal for the joint, and a conduit connecting the interior of the gasket and tank, at least one of the edges of the joint-forming portions of the closure and tank adjacent which the gasket bears being cut away to form a groove, the inflation of the gasket causing the same to be directed into said groove.

9. In a tank for holding a fluid under pressure, a closure therefor, said closure having a gasket chamber, and an inflatable gasket within said chamber, said gasket, when inflated, bearing against and sealing a portion of the joint between the tank and closure, the closure having a passage extending therethrough for connecting the interior of the gasket and tank, at least one of the edges of the joint-forming portions of the closure and tank against which the gasket bears being cut away to form a groove, the inflation of the gasket causing the same to be directed into said groove.

In testimony whereof, I have signed my name to this specification.

HARRY H. PURVIS.